US 6,804,254 B1

United States Patent
Pearce et al.

(10) Patent No.: US 6,804,254 B1
(45) Date of Patent: Oct. 12, 2004

(54) SYSTEM AND METHOD FOR MAINTAINING A COMMUNICATION LINK

(75) Inventors: Christopher E. Pearce, Dallas, TX (US); Delon R. Whetten, Allen, TX (US); Ronald D. Higgins, The Colony, TX (US); Scott Henning, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/477,192

(22) Filed: Jan. 4, 2000

(51) Int. Cl.[7] .................................................. H04J 3/16
(52) U.S. Cl. ........................ 370/467; 370/469; 370/352; 370/401; 709/227; 709/231; 379/93.09; 379/88.13; 379/88.17; 379/93.35
(58) Field of Search ................................ 370/467, 401, 370/402, 464, 465, 466, 469, 493, 351, 352, 356, 389, 395.5, 395.52, 395.53; 709/200, 218, 204, 227, 231, 247, 322; 379/211.02, 219, 88.13, 220.01, 221.01, 243, 245, 93.09, 88.17, 93.11, 93.35

(56) References Cited

U.S. PATENT DOCUMENTS

| | | | |
|---|---|---|---|
| 4,631,534 A | 12/1986 | Franklin et al. ............ 340/825 |
| 5,033,079 A | * 7/1991 | Catron et al. ............ 379/93.14 |
| 5,058,110 A | 10/1991 | Beach et al. ............... 370/85.6 |
| 5,093,827 A | 3/1992 | Franklin et al. ............ 370/60.1 |
| 5,375,167 A | 12/1994 | Bales et al. ................. 379/207 |
| 5,420,852 A | 5/1995 | Anderson et al. ........... 370/364 |
| 5,455,855 A | 10/1995 | Hokari ........................ 379/229 |
| 5,471,318 A | 11/1995 | Ahuja et al. ................. 358/400 |
| 5,559,883 A | 9/1996 | Williams .................... 713/201 |
| 5,610,910 A | * 3/1997 | Focsaneanu et al. ........ 370/351 |
| 5,623,488 A | 4/1997 | Svennevik et al. ......... 370/360 |
| 5,636,371 A | 6/1997 | Yu .............................. 395/500 |
| 5,640,446 A | 6/1997 | Everett et al. .............. 379/115 |
| 5,692,039 A | * 11/1997 | Brankley et al. ........... 379/229 |
| 5,710,591 A | 1/1998 | Bruno et al. ................. 348/15 |
| 5,748,736 A | 5/1998 | Mittra ........................ 713/163 |
| 5,781,550 A | 7/1998 | Templin et al. ............. 370/401 |
| 5,802,058 A | 9/1998 | Harris et al. ................ 370/410 |
| 5,803,199 A | 9/1998 | Walter ........................ 180/120 |
| 5,867,494 A | 2/1999 | Krishnaswamy et al. ... 370/352 |
| 5,867,495 A | 2/1999 | Elliott et al. ................ 370/352 |
| 5,872,779 A | 2/1999 | Vaudreuil ................... 370/352 |
| 5,884,025 A | 3/1999 | Baehr et al. ........... 395/187.01 |
| 5,896,379 A | 4/1999 | Haber ........................ 370/390 |
| 5,940,479 A | 8/1999 | Guy et al. ................ 379/93.01 |
| 5,963,547 A | 10/1999 | O'Neil ........................ 370/260 |
| 5,983,005 A | 11/1999 | Monteiro et al. ...... 395/200.61 |
| 6,006,272 A | 12/1999 | Aravamudan et al. ...... 709/245 |
| 6,018,766 A | 1/2000 | Samuel et al. .............. 709/218 |
| 6,138,144 A | 10/2000 | DeSimone et al. ......... 709/204 |
| 6,151,679 A | 11/2000 | Friedman et al. ........... 713/201 |
| 6,154,839 A | 11/2000 | Arrow et al. ............... 713/154 |
| 6,163,810 A | 12/2000 | Bhagavath et al. ......... 709/238 |
| 6,173,314 B1 | 1/2001 | Kurashima et al. ......... 709/204 |
| 6,175,618 B1 | * 1/2001 | Shah et al. ............ 379/207.13 |
| 6,175,867 B1 | 1/2001 | Taghadoss .................. 709/223 |
| 6,181,697 B1 | 1/2001 | Nurenberg et al. ......... 370/390 |

(List continued on next page.)

*Primary Examiner*—Dang Ton
*Assistant Examiner*—Tri H. Phan
(74) *Attorney, Agent, or Firm*—Baker Botts L.L.P.

(57) ABSTRACT

A method is provided for maintaining media streaming to a telephony device. The method includes establishing a media streaming link between a first telephony device and a second telephony device using a media termination point. The media streaming between the first telephony device and the second telephony device passes through the media termination point. The method further includes receiving a request to implement a telephony feature requiring media streaming termination between the first and second telephony devices. The method also includes terminating the media streaming between the first telephony device and the media termination point while maintaining the media streaming between the second telephony device and the media termination point.

42 Claims, 4 Drawing Sheets

U.S. PATENT DOCUMENTS

| | | | |
|---|---|---|---|
| 6,212,550 B1 | 4/2001 | Segur | 709/206 |
| 6,226,373 B1 * | 5/2001 | Zhu et al. | 379/207.02 |
| 6,259,701 B1 | 7/2001 | Shur et al. | 370/401 |
| 6,321,336 B1 | 11/2001 | Applegate et al. | 713/201 |
| 6,360,265 B1 | 3/2002 | Falck et al. | 709/277 |
| 6,363,411 B1 | 3/2002 | Dugan et al. | 709/202 |
| 6,363,424 B1 * | 3/2002 | Douglas et al. | 709/224 |
| 6,374,298 B2 | 4/2002 | Tanno | 709/227 |
| 6,385,193 B1 | 5/2002 | Civanlar et al. | 370/352 |
| 6,389,130 B1 * | 5/2002 | Shenoda et al. | 379/221.08 |
| 6,389,462 B1 | 5/2002 | Cohen et al. | 709/218 |
| 6,404,745 B1 | 6/2002 | O'Neil et al. | 370/260 |
| 6,404,746 B1 * | 6/2002 | Cave et al. | 370/262 |
| 6,404,764 B1 * | 6/2002 | Jones et al. | 370/352 |
| 6,418,138 B1 | 7/2002 | Cerf et al. | 370/352 |
| 6,421,437 B1 * | 7/2002 | Slutsman | 379/201.02 |
| 6,430,176 B1 * | 8/2002 | Christie, IV | 370/355 |
| 6,446,127 B1 * | 9/2002 | Schuster et al. | 709/227 |
| 6,449,269 B1 | 9/2002 | Edholm | 370/352 |
| 6,456,615 B1 | 9/2002 | Kikinis | 370/352 |
| 6,477,169 B1 | 11/2002 | Angle et al. | 370/395.42 |
| 6,480,594 B1 | 11/2002 | Van Tol | 379/221.02 |
| 6,487,196 B1 * | 11/2002 | Verthein et al. | 370/352 |
| 6,512,818 B1 * | 1/2003 | Donovan et al. | 379/88.18 |
| 6,529,514 B2 * | 3/2003 | Christie et al. | 370/401 |
| 6,567,851 B1 | 5/2003 | Kobayashi | 709/228 |
| 6,603,849 B2 * | 8/2003 | Lin et al. | 379/221.01 |
| 6,608,825 B1 * | 8/2003 | Luddy | 370/342 |
| 6,614,784 B1 * | 9/2003 | Glitho et al. | 370/352 |

* cited by examiner

SYSTEM AND METHOD FOR MAINTAINING A COMMUNICATION LINK

CROSS-REFERENCE TO RELATED APPLICATIONS

This application is filed concurrently with the following commonly-owned applications:

SYSTEM AND METHOD FOR PROVIDING SECURITY IN A TELECOMMUNICATION NETWORK, Ser. No. 09/477,193;

SYSTEM AND METHOD FOR ENABLING MULTICAST TELECOMMUNICATIONS, Ser. No. 09/477,298; and SYSTEM AND METHOD FOR A VIRTUAL TELEPHONY INTERMEDIARY, Ser. No. 09/477,297.

TECHNICAL FIELD OF THE INVENTION

This invention relates generally to the field of telecommunications, and more specifically to a system and method for maintaining a communication link.

BACKGROUND OF THE INVENTION

Historically, telecommunications have involved the transmission of voice and fax signals over a network dedicated to telecommunications, such as the Public Switched Telephone Network (PSTN) or a Private Branch Exchange (PBX). Similarly, data communications between computers have also historically been transmitted on a dedicated data network, such as a local area network (LAN) or a wide area network (WAN). Currently, telecommunications and data transmissions are being merged into an integrated communication network using technologies such as Voice over Internet Protocol (VoIP). Since many LANs and WANs transmit computer data using Internet Protocol (IP), VoIP uses this existing technology to transmit voice and fax signals by converting these signals into digital data and encapsulating the data for transmission over an IP network. However, the integration of telecommunications and data transmissions is still ongoing, and many features that were available to users of traditional telecommunications networks have not been made available to users of VoIP and similar technologies.

SUMMARY OF THE INVENTION

In accordance with the present invention, a system and method for maintaining a communication link is provided that substantially eliminates or reduces disadvantages or problems associated with previously developed systems and methods. In particular, the present invention contemplates a media termination point capable of serving as an intermediary between two or more telephony devices to maintain a connection with at least one telephony device while terminating the media streaming between the devices.

In one embodiment of the present invention, a method is provided for maintaining media streaming to a telephony device. The method includes establishing a media streaming link between a first telephony device and a second telephony device using a media termination point. The media streaming between the first telephony device and the second telephony device passes through the media termination point. The method further includes receiving a request to implement a telephony feature requiring media streaming termination between the first and second telephony devices. The method also includes terminating the media streaming between the first telephony device and the media termination point while maintaining the media streaming between the second telephony device and the media termination point.

In another embodiment of the present invention, a communication network is provided that includes a first telephony device utilizing a protocol compatible with a telephony feature requiring media streaming termination, and a second telephony device utilizing a protocol incompatible with the telephony feature requiring media streaming termination. The communication network also includes a media termination point operable to maintain media streaming with the second telephony device after termination of media streaming between the first telephony device and the second telephony device to enable the telephony feature requiring media streaming termination between the first and second telephony devices.

Technical advantages of the present invention include a system and method for maintaining a communication link that allow telephony features requiring the termination of media streaming between the participating telephony devices to be extended to telephony devices that are incompatible with such a termination. According to the present invention, a media termination point may be logically inserted between two or more telephony devices to act as an intermediary between these devices. Signaling connections can then be maintained between the telephony devices and the media termination point while temporarily terminating media streaming between the telephony devices. Features that are enabled using such a media termination point include call hold, call transfer, call park and conference calls. Other technical advantages are readily apparent to one skilled in the art from the following figures, descriptions, and claims.

BRIEF DESCRIPTION OF THE DRAWINGS

For a more complete understanding of the present invention, and for further features and advantages, reference is now made to the following description, taken in conjunction with the accompanying drawings, in which.

DETAILED DESCRIPTION OF THE INVENTION

Figure 1:
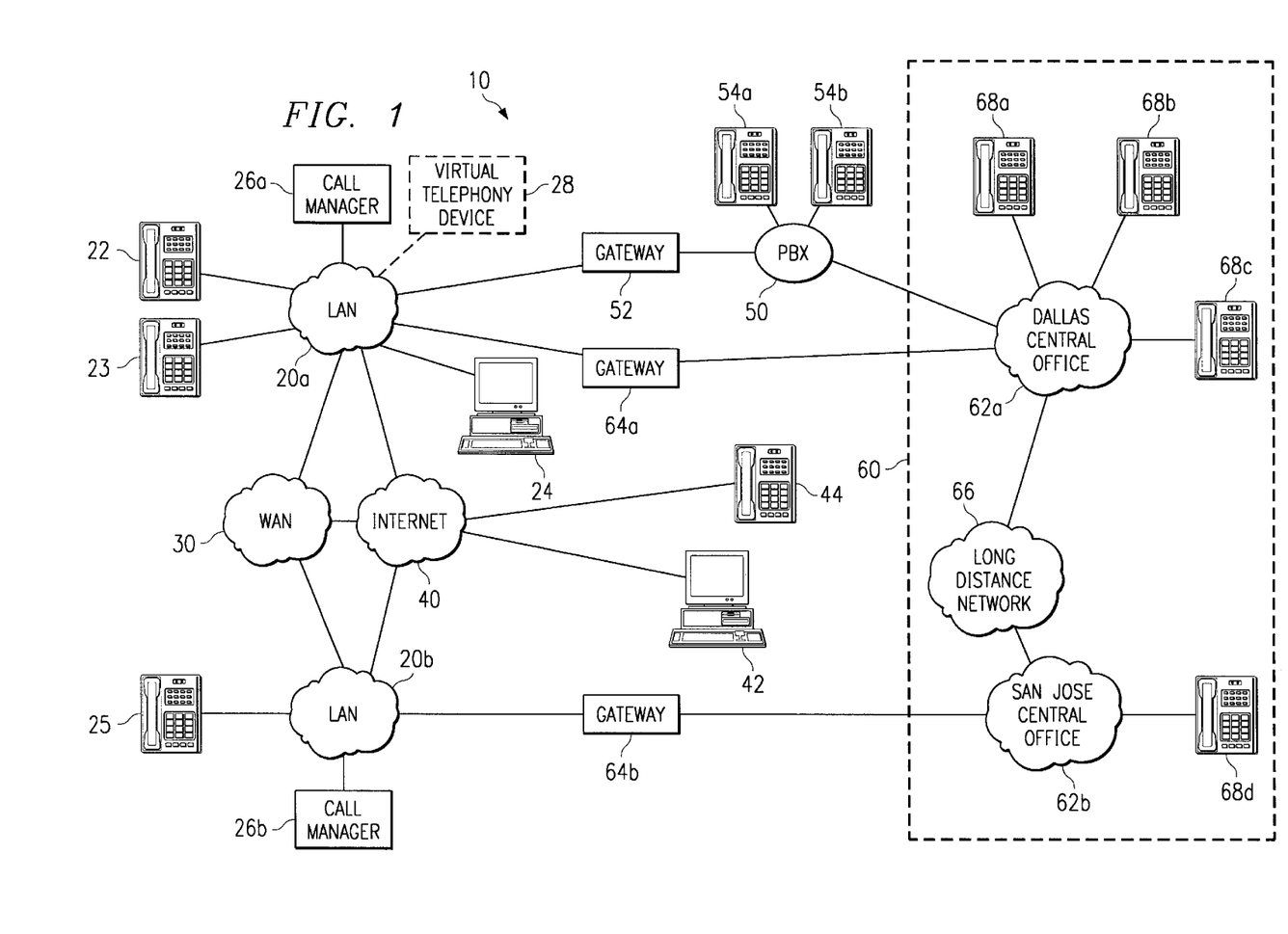
FIG. 1 illustrates an exemplary communications network in accordance with the present invention.

FIG. 1 illustrates an exemplary communication network 10. Although a specific communication network is illustrated in FIG. 1, the term "communication network" should be interpreted as generically defining any network capable of transmitting telecommunication signals, data, and/or messages. In the illustrated embodiment, communication network 10 includes a plurality of local area networks (LANs)

20 interconnected using a wide area network (WAN) 30. Each LAN 20 is a computer data network that is further operable to transmit audio and/or video telecommunication signals. In the particular embodiment illustrated in FIG. 1, LANs 20 are Internet Protocol (IP) networks. However, LANs 20 may be any type of network that allows the transmission of audio and video telecommunications, as well as traditional data communications. Therefore, although subsequent description will primarily focus on IP telephony devices, it should be understood that other appropriate telephony devices, such as Voice over Frame Relay devices, are also included within the scope of this description.

LANs 20 may be directly coupled to other IP networks including, but not limited to, WAN 30 and any IP networks coupled to WAN 30 (such as other LANs 20 or the Internet 40). Since all IP networks share a common method of transmitting data, telecommunication signals may be transmitted between telephony devices located on different, but interconnected, IP networks. In addition to being coupled to other IP networks, LANs 20 may also be coupled to non-IP telecommunication networks through the use of gateways. For example, LAN 20a is coupled to a private branch exchange (PBX) 50 through a gateway 52. PBX 50 represents analog and/or digital telephone systems used by businesses. PBX 50 includes a plurality of extension telephones or subscriber sets 54a and 54b to which PBX 50 directs incoming telephone calls. Gateway 52 may be either an analog or a digital gateway depending on the type of PBX 50 to which it is coupled. The operation of the gateways in communication network 10 is described in further detail below.

Another non-IP network to which LANs 20 may be coupled is the Public Switched Telephone Network (PSTN) 60. PSTN 60 includes switching stations, central offices, mobile telephone switching offices, pager switching offices, remote terminals, and other related telecommunications equipment that are located across the country. For example, central offices (COs) 62 connect telephone customers, such as residences and businesses, to PSTN 60. In the illustrated embodiment, LANs 20 are coupled to selected central offices 62 through the use of gateways 64, described below.

Central offices 62 are coupled through a long distance network 66 that allows communication between residences and businesses coupled to central offices in different areas, such as CO 62a in Dallas and CO 62b in San Jose. The entity that owns the communication lines comprising long distance network 66 (there are typically several different entities, each having their own communication lines) charges a fee for the use of these lines. However, one advantage of IP telephony is that a company owning (or leasing) LANs 20 and WAN 30 may avoid such fees for calls between LAN 20a and LAN 20b by using WAN 30 to transmit calls between the LANs. Internet 40 may also be used to transmit calls.

IP networks transmit data (including voice and video data) by placing the data in packets and sending each packet individually to the selected destination. Unlike a circuit-switched network (like PSTN 60), dedicated bandwidth is not required for the duration of a call or fax transmission over LANs 20, WAN 30 or Internet 40. Instead, each telephony device sends packets across the network as they become available for transmission. This feature makes bandwidth available for other data when voice or fax data is not being transmitted.

The technology that allows telecommunications to be transmitted over an IP network may be referred to as Voice over IP (VoIP). IP telephony devices 22–24 are coupled to LAN 20a to allow such communication over LAN 20a. IP telephony devices 22–24 have the capability of encapsulating a user's voice (or other inputs) into IP packets so that the voice can be transmitted over LAN 20a, WAN 30 and/or Internet 40. IP telephony devices may include telephones, fax machines, computers running telephony software (such as MICROSOFT NETMEETING), gateways, or any other device capable of performing telephony functions over an IP network.

An IP telephony device typically resembles a traditional digital PBX telephony device, but instead of connecting to a proprietary PBX port, the telephony device plugs into a LAN jack, such as an Ethernet jack. Alternatively, a user may plug a handset or headset directly into a personal computer 24 on LAN 20 to form a virtual IP telephony device. An IP telephony device operates as a standard IP network device and typically has its own IP address (which may be assigned dynamically). IP telephony devices may be H.323-compliant, so that they can communicate with other H.323 devices, such as a device executing MICROSOFT NETMEETING. This feature is described in more detail below. IP telephony devices may also have the ability to handle data coding and decoding at the telephony device. This feature allows the telephony device to switch compression schemes on demand, such as switching between g.711 and G.723 compression.

A call manager 26a controls IP telephony devices 22–24 (a similar call manager 26b may be located on LAN 20b). Call manager 26a is an application that controls call processing, routing, telephone features and options (such as call hold, call transfer and caller ID), device configuration, and other telephony functions and parameters within communication network 10. Call manager 26a can control all of the IP telephony devices on LAN 20a, and it may also control IP telephony devices located across WAN 30. For example, call manager 26a is capable of controlling telephony devices on LAN 20b. Thus, call manager 26b may be eliminated entirely or used as a redundant controller.

When a user wishes to place a call from one IP telephony device on LAN 20a to another IP telephony device on LAN 20a (an intra-LAN call), the calling telephony device transmits a signal to call manager 26a indicating the desired function and the telephony device to be called. Call manager 26a then checks on the availability of the called telephony device and, if available, sets up the call by instructing the originating telephony device to establish a media (audio and/or video) stream with the called (target) telephony device. The initial signaling between call manager 26a and either the originating telephony device or the target telephony device is transmitted over LAN 20a (and, if necessary, WAN 30) using, for example, the Transmission Control Protocol (TCP).

The TCP layer in the transmitting telephony device divides the data to be transmitted into one or more packets, numbers the packets, and then forwards them individually to the IP network layer for transmission to the destination telephony device. Although each packet has the same destination IP address, the packets may travel along different paths to reach the intended destination. As the packets reach the destination telephony device, the TCP layer reassembles the individual packets and ensures that they all have arrived. Once TCP reassembles the data, it forwards the data to the destination telephony device as a single message.

After call manager 26a initiates the call with signaling over TCP, a codec (coder/decoder) converts the voice, video or fax signals generated by the users of the telephony devices from analog voice signals into digital form. The codec may be implemented either in software or as special-purpose hardware in IP telephony devices 22–24. In the case of an IP telephone, as the user speaks into the handset, the codec converts the analog voice signals into digital data. The digitally encoded data is then encapsulated into IP packets so that it can be transmitted over LAN 20a.

The encapsulation may be performed by Real-Time Transport Protocol (RTP) running over User Datagram Protocol (UDP), or any other suitable communication protocol. As with TCP, UDP uses the Internet Protocol to get data packets from one computer to another. Unlike TCP, however, UDP does not provide sequencing and error-checking of the arriving packets. However, since UDP does not perform these functions, UDP operates faster than TCP and is useful when speed is more important than accuracy. This is true of media streaming since it is critical that the data be transmitted as quickly as possible, but it is not critical that every single packet is reassembled correctly (either its absence is negligible or its content can be extrapolated by the destination telephony device). Once UDP has received and reassembled the IP packets at the destination telephony device, a codec in the destination telephony device translates the digital data into analog audio and/or video signals for presentation to the user. The entire process is repeated each time that any call participant (or any other source) generates an audio, video, or fax signal.

In addition to intra-LAN calls, calls can also be placed to and received from non-IP telephony devices 54, 68 that are connected to PBX 50 or PSTN 60. Such calls are made through a gateway 52, 64. Because gateway 52 performs similarly to gateway 64, only gateway 64 will be discussed in further detail. Gateway 64 converts analog or digital circuit-switched data transmitted by PSTN 60 to packetized data transmitted by LAN 20, and vice-versa. When voice data packets are transmitted from LAN 20, gateway 64 retrieves the data contained in the incoming packets and converts this digital data to the analog or digital format used by the PSTN trunk to which gateway 64 is coupled. Since the digital format for voice transmissions over an IP network is often different than the format used on the digital trunks of PSTN 60, the gateway provides conversion between these different digital formats, referred to as transcoding. Gateway 64 also translates between the VoIP call control system and the Signaling System 7 (SS7) protocol or other signaling protocols used in PSTN 60.

For voice transmissions from PSTN 60 to LAN 20, the process is reversed. Gateway 64 takes the incoming voice transmission (in either analog or digital form) and converts it into the digital format used by LAN 20. The digital data is then encapsulated into IP packets and transmitted over LAN 20.

When making a call to a PSTN telephony device 68 from IP telephony device 22 on LAN 20a, the voice or fax signal generated by the user of IP telephony device 22 is digitized and encapsulated, as described above. The packets are then transmitted over LAN 20a to gateway 64. If more than one PSTN gateway 64 is coupled to LAN 20a, call manager 26a determines which gateway is to receive the transmission based on the telephone number (e.g., the North American Numbering Plan (NANP) number) of the PSTN telephony device. Gateway 64 retrieves the IP packets and converts the data to the format (either digital or analog) used by the PSTN trunk to which the gateway is connected. The voice signals are then sent to PSTN telephony device 68 over PSTN 60. This process, and the reverse process, is continued between PSTN 60 and LAN 20a through gateway 64 until the call is complete.

Calls can also be made between an IP telephony device located on LAN 20 and another IP telephony device located on another LAN 20, across WAN 30, or on Internet 40. For example, a call may be placed between IP telephony device 22 connected to LAN 20a and IP telephony device 25 connected to LAN 20b. As discussed above, the analog voice or fax data is digitized and encapsulated into IP packets at the originating IP telephony device 22. However, unlike communications with telephony devices on PSTN 60, gateway 64 is not needed to convert the IP packets to another format. Instead, a router (or other similar device) directs the packets to the IP address of the target IP telephony device 25. IP telephony device 25 then retrieves the data and coverts it to analog form for presentation to the user. Either call manager 26a or call manger 26b (on LAN 20b) may control IP telephony device 25.

When a call is placed to an IP telephony device, for example IP telephony device 22, a call initiation request is first sent to call manager 26a. If the originating telephony device is an IP telephony device (e.g., an intra-LAN or inter-LAN IP call), the originating IP telephony device generates the call initiation request and sends the request to call manager 26a. If the originating telephony device is a non-IP telephony device, such as PSTN telephony device 68, gateway 64a first intercepts the incoming call from CO 62a, and sends a call initiation request to call manager 26a indicating the IP telephony device that is being called. In either case, once call manager 26a receives the call initiation request, call manager 26a sends a signal to IP telephony device 22 offering the call to the telephony device.

If IP telephony device 22 can accept the call (e.g., it is not in use or under a Do Not Disturb instruction from the user), IP telephony device 22 replies to call manager 26a that it will accept the call. Upon receiving this acceptance, call manager 26a transmits a signal to IP telephony device 22 to cause it to ring. The telephony device's user can then hear the ring and can take the telephony device "off-hook" to receive the call. Taking the telephony device off-hook may include, but is not limited to, picking up a handset, pressing the ringing line's button, pressing a speakerphone button, or otherwise indicating that the telephony device is ready to receive the incoming call. For the purposes of this application, the term "off-hook" is used to generically indicate a condition of a telephony device when it is ready to initiate or receive telecommunication signals. Once IP telephony device 22 has been taken off-hook, call manager 26a establishes an RTP audio and/or video stream between IP telephony device 22 and the originating telephony device. If the originating telephony device is a non-IP telephony device, such as PSTN telephony device 68, the data streaming occurs between IP telephony device 22 and gateway 64. Gateway 64 then transmits the audio and/or video data to PSTN telephony device 68.

One advantage associated with IP telephony devices is their ability to communicate and interact with any other IP device coupled to the IP network. For example, IP telephony devices may interact and communicate with other IP telephony devices, with non-IP telephony devices, and even with virtual telephony devices. A virtual telephony device may be implemented as software, firmware and/or hardware to interact with devices in communication network 10. Virtual telephony devices may be implemented as software or firmware on any existing or dedicated device on the IP network. For example, call manager 26a may contain software for implementing one or more virtual telephony devices 28. Virtual device software or firmware may also be located on any other network device. The computer or other device on which the virtual telephony software is located includes a network interface, a memory to store the software, and a processor to execute the software.

Virtual telephony devices may be logically inserted between two or more telephony devices to act as an intermediary between the two telephony devices. Once such a relationship is set up, signaling and media streams that pass through the virtual telephony device may then be modified through address translation or data stream manipulation for various reasons before they are sent on to the destination device. Reasons for such modifications include providing network security, duplicating streams, dynamically redirecting streams, maintaining connections between devices, converting between data formats (e.g., A-Law to μ-Law), and injecting media.

In order for a call to be placed through a virtual telephony device, for example, a call placed to IP telephony device 22 in LAN 20 through virtual telephony device 28, telephony device 22 should be registered with virtual telephony device 28. Telephony device 22 is instructed by call manager 26a to register with virtual telephony device 28 at a specified IP address and port. Telephony device 22 signals virtual telephony device 28 via TCP/IP indicating that it would like to register. If virtual device 28 accepts the registration request, telephony device 22 sends a registration message to virtual device 28 using UDP/IP (or any other appropriate media transmission protocol). The registration message typically comprises information about the telephony device such as the telephony device's IP and media access control (MAC) addresses, the type of telephony device, and the codec(s) used by the telephony device.

Figure 2:
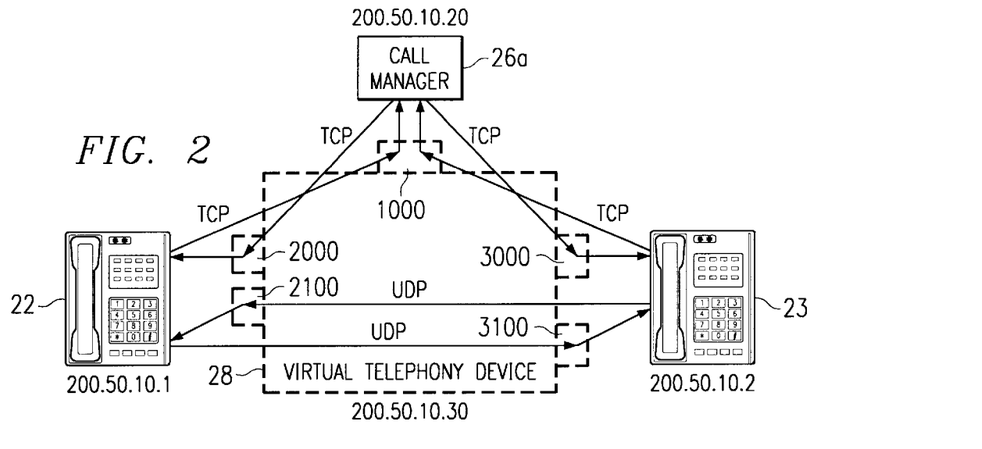
FIG. 2 illustrates an exemplary communication link between telephony devices using a virtual telephony device.

FIG. 2 illustrates an exemplary communication link created using virtual telephony device 28. It should be noted that although the TCP and UDP protocols are specifically identified in the following discussion, any other suitable signaling and media transmission protocols may be used. Virtual device 28 initiates this communication link by first creating a logical connection to telephony device 22. Creating this logical connection involves associating logical UDP and/or TCP ports of the virtual device with telephony device 22. Virtual device 28 designates a TCP port (for example, port 2000) as the signaling port of telephony device 22, and designates a UDP port (for example, port 2100) as the streaming port of telephony device 22. Virtual telephony device 28 may instruct call manager 26a to send all signaling directed to telephony device 22 to logical port 2000 of virtual device 28. Likewise, virtual telephony device 28 may instruct call manager 26a to send all media streaming directed to telephony device 22 from other telephony devices to logical port 2100 of virtual device 28. Virtual telephony device 28 will automatically forward any data that is subsequently sent to these ports to telephony device 22.

In order to create a communication link between telephony devices 22 and 23, a logical connection is also made to telephony device 23. For example, telephony device 23 may be assigned a logical TCP port of 3000 and a logical UDP port of 3100 of virtual device 28. Likewise, virtual device 28 may also designate a TCP port (for example, port 1000) as the signaling port of call manager 26a (data is typically not streamed using RTP to and from call manager 26, so a UDP port is usually not required). Virtual telephony device 28 may then instruct telephony devices 22 and 23 (as well as any other registered telephony devices) to send all signaling directed to call manager 26a to logical port 1000 of virtual device 28. In this manner, UDP streaming between telephony devices 22 and 23, as well as TCP signaling between the telephony devices and call manager 26, can be transmitted via virtual device 28.

Figure 3:
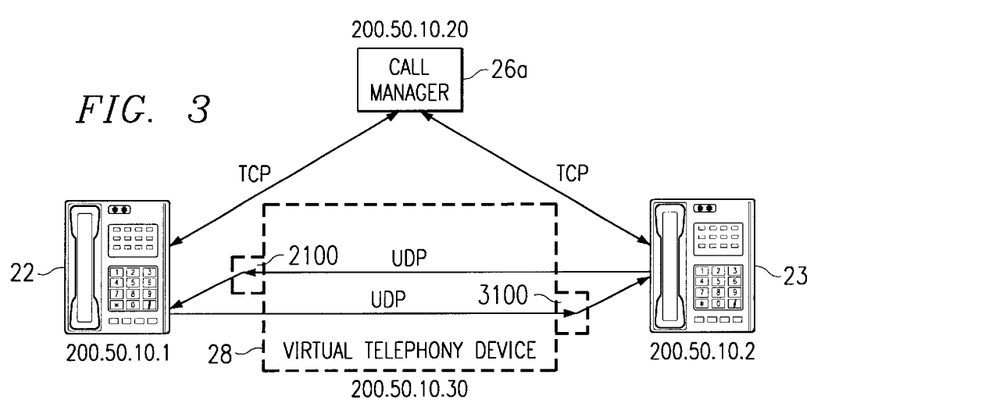
FIG. 3 illustrates another exemplary communication link between telephony devices using a virtual telephony device.

FIG. 3 illustrates an alternative communication link between telephony devices 22 and 23. Although FIG. 2 shows the TCP signaling between IP telephony devices and call manager 26a being directed through virtual device 28, this signaling may also be directly transmitted between call manager 26a and telephony devices 22 and 23. In this case, virtual device 28 is used only as an intermediary through which RTP streams between telephony devices 22 and 23 are sent using logical UDP ports 2100 and 3100.

The communication links illustrated in FIGS. 2 and 3 are used to enable a call between telephony devices 22 and 23 as follows. Telephony device 23 initially sends a call initiation request via TCP to call manager 26a indicating a desire to communicate with telephony device 22. Call manager 26a then sends signaling information via TCP to telephony device 22 indicating the incoming call from telephony device 23. This TCP signaling between telephony device 23 and call manager 26a may be passed through virtual device 28, as illustrated in FIG. 2, or it may be directly transmitted between telephony device 23 and call manager 26a, as shown in FIG. 3. If telephony device 22 accepts the call, call manager 26a establishes RTP media streaming between telephony devices 22 and 23 by signaling telephony device 23 to begin streaming media to port 2100 of virtual device 28.

When media packets are received at port 2100, virtual device 28 examines the packets and notes the source address of the data. This source address is the IP address of telephony device 23, for example, 200.50.10.2, and a particular logical port of the IP address. Since telephony device 23 has registered with virtual device 28, virtual device 28 then modifies the source address and port in the header of the IP packets coming from telephony device 23 to the IP address and logical UDP port of virtual device 28 that have been associated with telephony device 23 (200.50.10.30, port 3100). Virtual device 28 then forwards the packets on to telephony device 22. Since the header of each packet indicates the data stream originated from port 3100 of virtual device 28, it appears to telephony device 22 that telephony device 23 is actually located at this address and port.

A similar process is performed when telephony device 22 returns an RTP media stream in response to the media stream from telephony device 23. Since telephony device 22 believes that telephony device 23 is located at port 3100 of virtual device 28, telephony device 22 directs its data streaming to this location. When virtual device 28 receives the IP packets at port 3100, virtual device 28 modifies the source IP address and port in the packets header from the actual port and IP address (200.50.10.1) of telephony device 22 to port 2100 of virtual device 28. Virtual device 28 then forwards the packets to telephony device 23 since the packets were received at port 3100. Since the header of each packet indicates that the data stream originated from port 2100 of virtual device 28, it appears to telephony device 23 that telephony device 22 is actually located at this address and port. All subsequent RTP streams sent between telephony devices 22 and 23 are similarly passed through and modified by virtual telephony device 28.

Since all data that is sent between two or more IP telephony devices may be passed through virtual telephony device 28, virtual telephony device 28 can be used for other functions in addition to the address translation function described above. One such use is as a media termination point (MTP). An MTP is a form of virtual device 28 that allows fully functional communications between telephony devices that use different types of call or control signaling, data compression formats, sizes of data payloads, audio/video sampling lengths, or any other communication parameters that are different between the telephony devices.

One such use of an MTP is as an intermediary between telephony devices to allow the features that call manager 26a provides through proprietary signaling with certain IP telephony devices to be extended to telephony devices using other types of signaling, such as H.323 telephony devices. H.323 is a communications standard that specifies protocols and procedures for providing multimedia communication services (including real-time audio, video and data communications) over packet-switched networks, such as IP networks. The protocols specified by the H.323 standard include several types of audio and video codecs, RTP, and two signaling standards known as H.225 and H.245.

H.225 call control signaling is used to establish a connection between two or more H.323 telephony devices. Once the connection is established using H.225 signaling, H.245 streaming control signaling is used to manage the transmission of information between the telephony devices using RTP. H.245 signaling is used to transmit messages between the telephony devices that include information about the capabilities of each telephony device, instructions regarding the opening and closing of the logical channels over which the RTP media streams are transmitted, and information about flow-control.

Although many IP telephony devices are H.323-compliant, they do not necessarily use all of the protocols specified by the H.323 standard. For example, IP telephony devices may use a proprietary signaling protocol instead of H.225 and H.245 signaling. Proprietary signaling protocols often offer more features and flexibility than the protocols provided in the H.323 standard. Some of these telephony features include call hold, call transfer, call park, and call conferencing.

These features typically require that the media streaming connection between the participating telephony devices be temporarily terminated by closing the H.245 connection. However, an IP telephony device using H.225 signaling will typically "tear down" or terminate its side of a call if the H.245 connection to the telephony device is terminated. Therefore, once a feature such as hold is initiated by terminating the H.245 connection, a telephony device using H.225 signaling will drop out of the call and RTP media streaming cannot be reestablished with the telephony device without placing a new call to the telephony device (sending a new call initiation request). Thus, H.225 signaling has traditionally been incompatible with media streaming termination.

This problem can be solved by inserting an MTP into the call on behalf of the H.225 telephony device (or any other device using a protocol that is incompatible with media streaming termination). The call is then established by connecting the H.225 telephony device and the proprietary IP telephony device using the MTP as an intermediary. The MTP passes streaming media between the telephony devices as described above in conjunction with FIG. 3. By employing such a connection, features such as hold or transfer can be initiated by a proprietary IP telephony device connected to an H.225 telephony device, without causing the H.225 telephony device to tear down the call.

Figure 4:
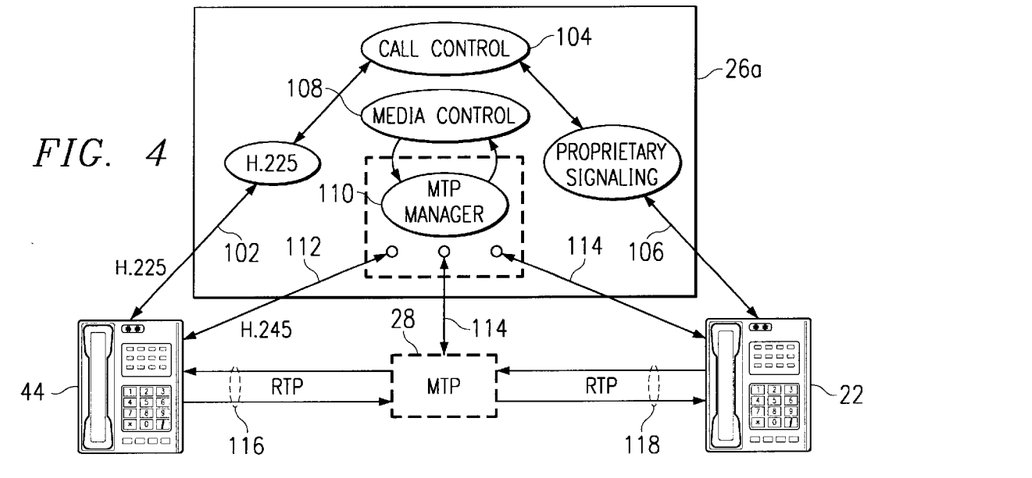
FIG. 4 illustrates a communication link between first and second telephony devices using a media termination point.

FIG. 4 illustrates a communication link established between a proprietary IP telephony device 22 and an H.225 telephony device 44 using an MTP 28. The communication link may be established by a processor executing call manager software stored on a computer-readable medium. The communications link includes a signaling link between telephony devices 22, 44 via call manager 26a, and a media streaming link between telephony devices 22, 44 via MTP 28. The communication link is established via MTP 28 such that the H.225 and H.245 signaling channels opened by telephony device 44 can be maintained after terminating a media stream between telephony device 44 and telephony device 22 (to allow the initiation of features such as call hold and transfer). H.225 telephony device 44 may be any type of device using H.225 signaling, including, but not limited to, IP and non-IP telephones, gateways coupling a packet-switched telephony network (such as LAN 20a) to PBX 50, PSTN 60 or any other circuit-switched network, and computers executing H.323 software such as MICROSOFT NETMEETING. Additionally, telephony device 44 may represent any other type of telephony device that uses any protocol incompatible with media streaming termination. For the purposes of this application, the term protocol means any format for transmitting data between two or more devices.

Assuming, as an example, that a call is originally placed by telephony device 44 to telephony device 22, the communication link is initiated using H.225 signaling 102 sent from telephony device 44 to call manager 26a (a call initiated from telephony device 22 would be placed in a similar manner, but using proprietary signaling). This H.225 signaling is a type of call initiation request that indicates a desire to set up a telephony device call with telephony device 22. A call control module 104 in call manager 26a receives H.225 signaling 102 and determines that telephony device 22 is being called. Call control module 104 then signals telephony device 22 using proprietary signaling 106 to indicate the request from telephony device 44. Telephony device 22 signals call manager 26a back indicating whether it can accept the call. In this manner, a signaling link is created between telephony device 44 and telephony device 22 via call manager 26a. If telephony device 22 can accept the call, a media streaming link is created between telephony device 44 and telephony device 22 using MTP 28.

Since telephony device 44 uses H.225 signaling, a media control module 108 in call manager 26a determines that MTP 28 is needed (alternatively, each telephony device may include a form of media control module 108). Media control module 108 initiates an MTP manager 110, which is a process running within call manager 26a. MTP manager 110 provides access to and control over the various MTPs available from call manager 26a. Although only one MTP 28 has been illustrated, numerous MTPs may be available through call manager 26a to facilitate several incoming calls. MTP manager 110 assigns MTP 28 to the call and establishes streaming control channels to telephony device 44, MTP 28, and telephony device 22. In the case of telephony device 44, this control channel comprises an H.245 signaling channel 112. For MTP 28 and telephony device 22, this streaming control is performed through proprietary signaling channels 114 (or any other type of signaling that supports media streaming termination).

Using control signaling 112 and 114, media streaming channels 116 are established between telephony device 44 and MTP 28. Likewise, media streaming channels 118 are established between MTP 28 and telephony device 22. As described above in conjunction with FIG. 3, telephony device 44 and telephony device 22 are then able to send RTP encapsulated media streams over channels 116, 118 to each other via MTP 28. MTP 28 receives the incoming media streams, notes the source address, and modifies the source address to the logical port of MTP 28 that is associated with the source device. This address modification can be performed by an address modification module of MTP 28. MTP 28 then communicates the data stream to the destination device (this communication may be performed by a transmission module, such as a UDP/IP stack). Since the call between telephony device 44 and telephony device 22 is connected using MTP 28, telephony device 44 is effectively insulated from telephony device 22, and features requiring the termination of media streaming channels 116 can be implemented, as described below.

Figure 5:
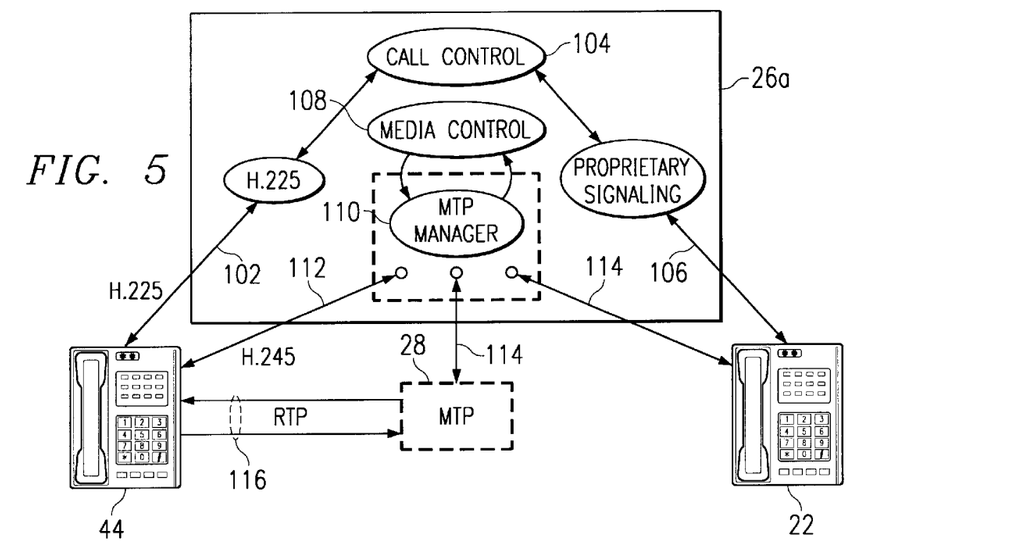
FIG. 5 illustrates the communication link of FIG. 4 after media streaming between the telephony devices has been terminated.

FIG. 5 illustrates the communication link of FIG. 4 after a call hold feature has been initiated from telephony device 22 to place telephony device 44 "on hold". For the purposes of this application, a hold feature is a function that temporarily terminates audio and/or video communications between two or more calling parties, but does not disconnect the call signaling between the parties. It should be understood that the following description applies equally to any other telephony feature that requires the termination of media streaming between the participating telephony devices.

When the hold feature is initiated from telephony device 22, media streaming channels 118 between IP telephony device 22 and MTP 28 are terminated or "torn down." However, because MTP 28 has been implemented, media streaming channels 116 between MTP 28 and telephony device 44 may be maintained while still effectively terminating the media streaming between telephony device 44 and telephony device 22. Since media streaming channels 116 are left open, H.245 signaling channel 112 is also left open, and telephony device 44 does not attempt to tear down H.225 channel 102, as described above. Thus, the connection between telephony device 44 and telephony device 22 is maintained. Any media streaming received by MTP 28 from telephony device 44 may then be discarded. Once the hold feature is discontinued at telephony device 22, media streaming channels 118 can then be re-established between telephony device 22 and MTP 28 through signaling over control channels 114, as shown in FIG. 4.

Figure 6:
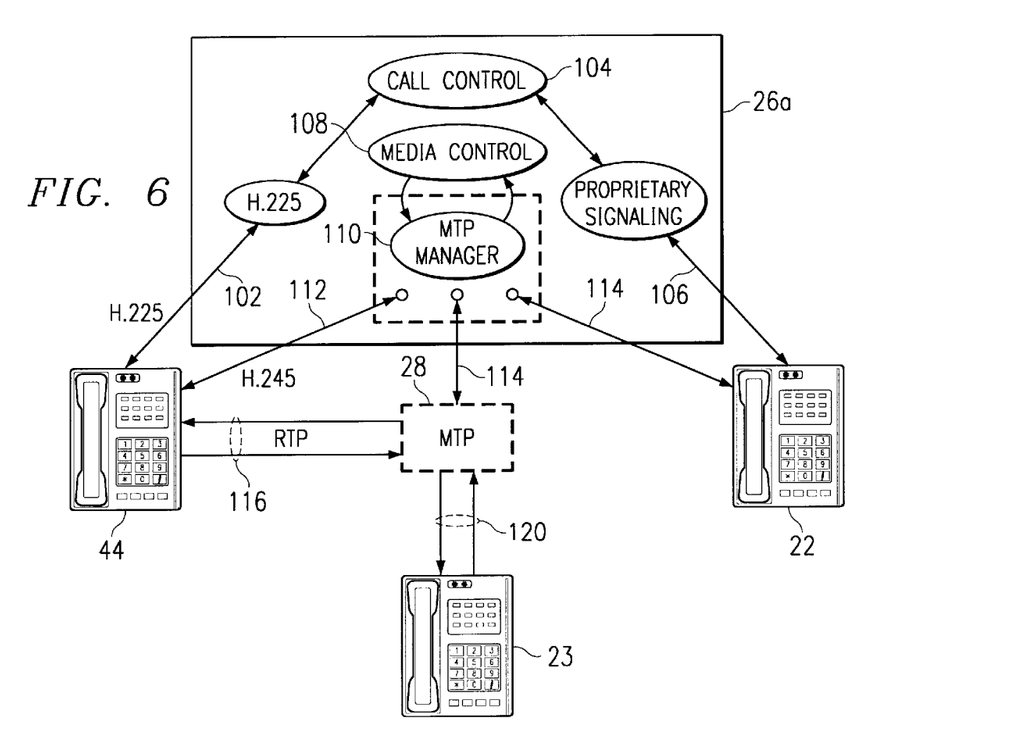
FIG. 6 illustrates the communication link of FIG. 4 after media streaming has been reestablished with a third telephony device.

FIG. 6 illustrates a method of establishing media streaming with a third telephony device after initiation of the telephony feature requiring media streaming termination. For example, in the case of a call transfer feature, media streaming can be established between a third telephony device, such as telephony device 23, and MTP 28 to allow communication between telephony device 44 and telephony device 23. When a call transfer feature is initiated from telephony device 22, the media streaming between telephony device 22 and MTP 28 is terminated as described above. Telephony device 22 signals call manager 26a and indicates that a connection is to be made between telephony devices 23 and 44. Call manager 26a signals telephony device 23 to indicate the incoming call (note that for clarity, the signaling connection to telephony device 23 is not shown). If telephony device 23 can accept the call, then call manager 26a instructs telephony device 23 to begin media streaming to MTP 28 (directed to the port associated with telephony device 44) over media streaming channels 120. Similarly, if a call conference feature had been selected from telephony device 22, then media streaming channels 118 between telephony device 22 and MTP 28 could also be reestablished to create a conference call between telephony devices 22, 23 and 44.

Figure 7:
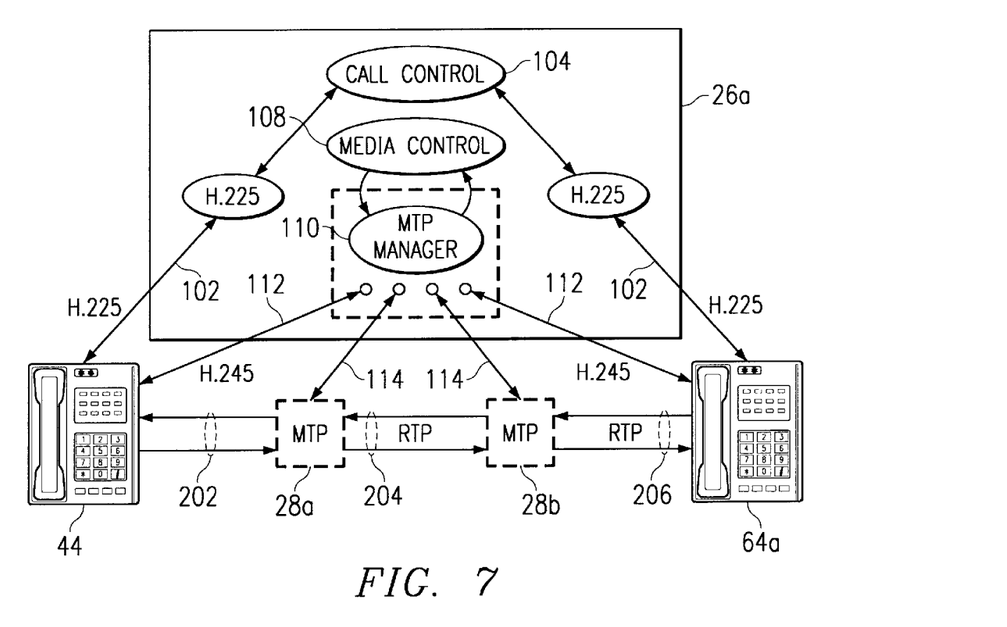
FIG. 7 illustrates a communication link between telephony devices using multiple media termination points.

FIG. 7 illustrates an alternative communication link between two H.225 telephony devices (neither telephony devices uses signaling that supports media streaming termination). Such a communication link is established by providing each H.225 telephony device with an MTP 28. Assuming, as an example, that a call is originally placed by H.225 telephony device 44 to H.225 telephony device 64a (a gateway supporting a connection to a PSTN telephony device), the communication link is initiated through H.225 signaling 102 sent from telephony device 44 to call manager 26a (a call initiated from telephony device 64a would be placed in a similar manner). Call control module 104 in call manager 26a receives H.225 signaling 102 and determines that telephony device 64a is being called. Call control module 104 then signals telephony device 64a using H.225 signaling 102 to indicate the request from telephony device 44. Telephony device 64a signals call manager 26a back indicating whether it can accept the call. In this manner, a signaling link is created between telephony device 44 and telephony device 64a via call manager 26a. If telephony device 64a can accept the call, a media streaming link is established between telephony devices 44 and 64a using MTPs 28a and 28b.

As with H.225 telephony device 44, H.225 telephony device 64a may be any type of device using H.225 signaling, including, but not limited to, IP and non-IP telephones, gateways coupling a packet-switched telephony network (such as LAN 20a) to PBX 50, PSTN 60 or any other circuit-switched network, and computers executing H.323 software such as MICROSOFT NETMEETING. Additionally, telephony device 64a may represent any other type of telephony device that uses any protocol incompatible with media streaming termination.

Since both telephony devices 44 and 64a use H.225 signaling, media control module 108 in call manager 26a determines that MTPs 28a and 28b are needed. As described above, media control module 108 initiates MTP manager 110. MTP manager 110 assigns MTP 28a to telephony device 44 and MTP 28b to telephony device 64a. MTP manager 44 further establishes streaming control channels to telephony devices 44, 64a and MTPs 28a, 28b. In the case of telephony devices 44 and 64a, these control channels are H.245 signaling channels 112. For MTPs 28a and 28b, this streaming control is performed through proprietary signaling 114. Using control signaling 112 and 114, media streaming channels 202 are opened between telephony device 44 and MTP 28a, and media streaming channels 206 are opened between telephony device 64a and MTP 28b. Similarly, control signaling 114 is used to open media streaming channels 204 between MTP 28a and MTP 28b.

As described above in conjunction with FIG. 3, telephony device 44 and telephony device 64a are then able to send RTP encapsulated media streams over channels 202, 204, and 206 to each other via MTPs 28a and 28b. The only difference between the communication link of FIG. 7 and that of FIG. 3 is that an extra MTP is added as an intermediary between the two telephony devices. MTP 28a receives incoming media streaming from telephony device 44, notes the source address, modifies the address to a logical port of MTP 28a that is associated with telephony device 44, and forwards the media stream to MTP 28b. MTP 28b then performs the same address translation to modify the source address to a logical port of MTP 28b that is associated with MTP 28a, and forwards the media stream to telephony device 64a. The same type of address translation occurs for media streaming from telephony device 64a directed to telephony device 44.

Since the call between telephony device 44 and telephony device 64a is being connected using MTP 28a and 28b, telephony device 44 is effectively insulated from telephony device 64a, and vice versa. Therefore, features requiring the termination of either media streaming channels 202 or media channels 206 can now be implemented. If either telephony device 44 or telephony device 64a initiates such a feature, media streaming channels 204 are temporarily terminated. Since media streaming channels 202 and 206 are left open, H.245 signaling channels 112 with both telephony devices 44 and 64a are also left open, and telephony devices 44 and 64a do not attempt to tear down H.225 channels 102. Therefore, media streaming channels 204 can be reestablished when the feature is discontinued (or streaming channels can be established with another telephony device, as described above).

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A method for maintaining media streaming to a telephony device, comprising:
   establishing a signaling link between a first telephony device and a second telephony device;
   establishing media streaming between the first telephony device and the second telephony device using a media termination point, whereby the media streaming between the first telephony device and the second telephony device passes through the media termination point;
   determining whether the second telephony device utilizes a protocol incompatible with a temporary termination of the established media streaming between the first and second telephony devices;
   generating the media termination point in response to a determination that the second telephony device utilizes a protocol incompatible with the temporary termination of the established media streaming between the first and second telephony devices;
   receiving a request to implement a telephony feature requiring temporary termination of the established media streaming between the first and second telephony devices; and
   temporarily terminating the established media streaming between the first telephony device and the media termination point while maintaining the media streaming between the second telephony device and the media termination point, and while maintaining the signaling link between the first and second telephony devices.

2. The method of claim 1, further comprising:
   receiving a call initiation request indicating a desire to create a communication link between the first telephony device and the second telephony device; and
   establishing the signaling link between the first telephony device and the second telephony device in response to the call initiation request.

3. The method of claim 1, wherein determining that the second telephony device utilizes a protocol incompatible with the temporary termination of the established media streaming comprises determining that the second telephony device uses a protocol that terminates the signaling link between the first telephony device and the second telephony device in response to termination of the media streaming between the first telephony device and the second telephony device.

4. The method of claim 1, wherein determining that the second telephony device utilizes a protocol incompatible with the temporary termination of the established media streaming comprises determining that the second telephony device uses H.225 call signaling.

5. The method of claim 1, wherein establishing the media streaming between the first telephony device and the second telephony device using the media termination point comprises:
   associating a first logical port of the media termination point with the first telephony device;
   receiving media streaming from the second telephony device at the first logical port;
   modifying source address information in the received media streaming to specify a second logical port of the media termination point associated with the second telephony device; and
   communicating the media streaming with the modified source address information to the first telephony device.

6. The method of claim 5, wherein associating a first logical port of the media termination point with the first telephony device comprises associating a User Datagram Protocol (UDP) logical port to enable the streaming of Internet Protocol (IP) packets.

7. The method of claim 6, wherein modifying source address information in the received media streaming comprises modifying a source IP address and port information in a header of an IP packet.

8. The method of claim 1, further comprising reestablishing the media streaming between the first telephony device and the media termination point in response to a discontinuation of the telephony feature.

9. The method of claim 1, further comprising establishing media streaming between a third telephony device and the media termination point to create a communication link between the second telephony device and the third telephony device according to the initiated telephony feature.

10. The method of claim 1, wherein receiving a request to implement a telephony feature requiring temporary termination of the established media streaming comprises receiving a request to implement a call hold feature, a call transfer feature, a call park feature, or a conference call feature.

11. A communication network, comprising:
   a first telephony device utilizing a protocol compatible with a telephony feature requiring a temporary termination of established media streaming;
   a second telephony device utilizing a protocol incompatible with the telephony feature requiring the temporary termination of the established media streaming; and
   a media termination point generated in response to a determination that the second telephony device utilizes a protocol incompatible with the temporary termination of the established media streaming between the first and second telephony devices, the media termination point operable to maintain media streaming with the second telephony device after temporary termination of media streaming between the first telephony device and the second telephony device to enable the telephony feature requiring the temporary termination of the established media streaming between the first and second telephony devices.

12. The communication network of claim 11, further comprising a call manager operable to:
   establish a signaling link between the first telephony device and the second telephony device;

establish the media streaming between the first telephony device and the second telephony device passing through the media termination point; and temporarily terminate the established media streaming between the first telephony device and the media termination point to enable the telephony feature requiring the temporary termination of the established media streaming between the first and second telephony devices while maintaining the signaling link between the first and second telephony devices.

13. The communication network of claim 12, wherein the call manager is further operable to reestablish the temporarily terminated media streaming between the first telephony device and the media termination point.

14. The communication network of claim 12, wherein the call manager is further operable to establish media streaming between a third telephony device and the media termination point to create a communication link between the second telephony device and the third telephony device according to the telephony feature requiring the temporary termination of the established media streaming termination.

15. The communication network of claim 11, wherein the media termination point comprises a logical device implemented using software executed on one or more devices coupled to the communication network.

16. The communication network of claim 11, wherein the protocol incompatible with the telephony feature requiring the temporary termination of the established media streaming comprises H.225 call signaling.

17. The communication network of claim 11, wherein the first telephony device and the second telephony device comprise Internet Protocol (IP) telephony devices.

18. The communication network of claim 12, wherein the media streaming between the first telephony device and the media termination point, and the media streaming between the media termination point and the second telephony device comprise Real-Time Transport Protocol (RTP) media streams.

19. A communication network, comprising:
a first telephony device utilizing a protocol incompatible with a telephony feature requiring a temporary termination of established media streaming;
a second telephony device utilizing a protocol incompatible with the telephony feature requiring the temporary termination of the established media streaming;
a first media termination point operable to maintain media streaming with the first telephony device after temporary termination of the established media streaming between the first telephony device and the second telephony device to enable the telephony feature requiring the temporary termination of the established media streaming between the first and second telephony devices; and
a second media termination point operable to maintain media streaming with the second telephony device after temporary termination of the established media streaming between the first telephony device and the second telephony device to enable the telephony feature requiring the temporary termination of the established media streaming between the first and second telephony devices.

20. The communication network of claim 19, further comprising a call manager operable to:
initiate the creation of a signaling link between the first and second telephony devices;
initiate the creation of media streaming between the first telephony device and the first media termination point, between the first media termination point and the second media termination point, and between the second media termination point and the second telephony device; and temporarily terminate the established media streaming between the first and second media termination points to enable the telephony feature requiring the temporary termination of the established media streaming between the first and second telephony devices, while maintaining the signaling link between the first and second telephony devices.

21. The communication network of claim 20, wherein the call manager is further operable to reestablish the media streaming between the first and second media termination points.

22. The communication network of claim 20, wherein the call manager is further operable to establish media streaming between a third telephony device and the second media termination point to create a communication link between the second telephony device and the third telephony device according to the telephony feature requiring the temporary termination of the established media streaming.

23. The communication network of claim 19, wherein the first and second media termination points comprise logical devices implemented using software executed on one or more devices coupled to the communication network.

24. The communication network of claim 19, wherein the protocol incompatible with the telephony feature requiring media streaming termination comprises H.225 call signaling.

25. The communication network of claim 19, wherein the first telephony device and the second telephony device are Internet Protocol (IP) telephony devices.

26. The communication network of claim 20, wherein the media streaming between the first telephony device and the first media termination point, the media streaming between the first media termination point and the second media termination point, and the media streaming between and the second media termination point and the second telephony device comprise Real-Time Transport Protocol (RTP) media streams.

27. A media termination point for use in a communication network including a first telephony device utilizing a protocol compatible with a telephony feature requiring a temporary termination of established media streaming and a second telephony device utilizing a protocol incompatible with the telephony feature requiring the temporary termination of the established media streaming, the media termination point comprising:
a first logical port associated with the first telephony device;
a second logical port associated with the second telephony device;
an address modification module operable to modify source address information in media streaming received at the first logical port from the second telephony device to specify the second logical port of the media termination point; and
a transmission module operable to communicate the media streaming with the modified source address information to the first telephony device if the telephony feature requiring the temporary termination of the established media streaming is not implemented, and further operable to discard the media streaming received at the first logical port from the second telephony device during an implementation of the telephony feature requiring the temporary termination of the established media streaming.

28. The media termination point of claim 27, wherein the first and second logical ports are User Datagram Protocol (UDP) logical ports.

29. The media termination point of claim 27, wherein the address modification module is operable to modify a source IP address and port information in a header of an IP packet.

30. A call manager for use in a communication network including a first telephony device utilizing a protocol compatible with a telephony feature requiring a temporary termination of established media streaming and a second telephony device utilizing a protocol incompatible with the telephony feature requiring the temporary termination of the established media streaming, the call manager comprising:
   a call control module operable to establish a signaling link between the first telephony device and the second telephony device; and
   a media control module operable to establish the media streaming between the first telephony device and the second telephony device passing through a media termination point, and further operable to temporarily terminate the established media streaming between the first telephony device and the media termination point to enable the telephony feature requiring the temporary termination of the established media streaming between the first and second telephony devices while maintaining the signaling link between the first and second telephony devices.

31. The call manager of claim 30, wherein the media control module is further operable to determine that the second telephony device utilizes a protocol incompatible with the temporary termination of the established media streaming, and to generate the media termination point in response to determining that the second telephony device utilizes the protocol incompatible with the temporary termination of the established media streaming.

32. The call manager of claim 30, wherein the media control module is further operable to reestablish the media streaming between the first telephony device and the media termination point.

33. The call manager of claim 30, wherein:
   the call control module is further operable to establish a signaling link with a third telephony device; and
   the media control module is further operable to establish media streaming between the third telephony device and the media termination point to create a communication link between the second telephony device and the third telephony device according to the telephony feature requiring the temporary termination of the established media streaming.

34. Call manager software embodied in a computer-readable medium and operable, when executed on a computer, to perform the following steps:
   establishing a signaling link between a first telephony device and a second telephony device,
   establishing the media streaming between the first telephony device and the second telephony device using a media termination point, whereby the media streaming between the first telephony device and the second telephony device passes through the media termination point;
   determining whether the second telephony device utilizes a protocol incompatible with a temporary termination of the established media streaming between the first and second telephony devices;
   generating the media termination point in response to a determination that the second telephony device utilizes a protocol incompatible with the temporary termination of the established media streaming between the first and second telephony devices;
   receiving a request to implement a telephony feature requiring temporary termination of the established media streaming between the first and second telephony devices; and
   temporarily terminating the established media streaming between the first telephony device and the media termination point while maintaining the media streaming between the second telephony device and the media termination point, and while maintaining the signaling link between the first and second telephony devices.

35. The call manager software of claim 34, further operable to perform the following steps:
   receiving a call initiation request indicating a desire to create a communication link between the first telephony device and the second telephony device; and
   establishing signaling the signaling link between the first telephony device and the second telephony device in response to the call initiation request.

36. The call manager software of claim 34, wherein determining that the second telephony device utilizes a protocol incompatible with the temporary termination of the established media streaming comprises determining that the second telephony device uses a protocol that terminates a signaling link between the first telephony device and the second telephony device in response to a termination of the media streaming between the first telephony device and the second telephony device.

37. The call manager software of claim 34, wherein determining that the second telephony device utilizes a protocol incompatible with the temporary termination of the established media streaming comprises determining that the second telephony device uses H.225 call signaling.

38. The call manager software of claim 34, wherein establishing the media streaming between the first telephony device and the second telephony device using the media termination point comprises:
   associating a first logical port of the media termination point with the first telephony device;
   receiving media streaming from the second telephony device at the first logical port;
   modifying source address information in the received media streaming to specify a second logical port of the media termination point associated with the second telephony device; and
   communicating the media streaming with the modified source address information to the first telephony device.

39. The call manager software claim 38, wherein associating a first logical port of the media termination point with the first telephony device comprises associating a User Datagram Protocol (UDP) logical port to enable the streaming of Internet Protocol (IP) packets.

40. The call manager software of claim 39, wherein modifying source address information in the received media streaming comprises modifying a source IP address and port information in a header of an IP packet.

41. The call manager software of claim 34, further operable to reestablish the media streaming between the first telephony device and the media termination point in response to a discontinuation of the telephony feature.

42. The call manager software of claim 34, further operable to establish media streaming between a third telephony device and the media termination point to create a communication link between the second telephony device and the third telephony device according to the telephony feature.

* * * * *

UNITED STATES PATENT AND TRADEMARK OFFICE
CERTIFICATE OF CORRECTION

PATENT NO. : 6,804,254 B1
DATED : October 12, 2004
INVENTOR(S) : Christopher E. Pearce et al.

It is certified that error appears in the above-identified patent and that said Letters Patent is hereby corrected as shown below:

Column 15,
Line 21, after "streaming", delete "termination".

Column 17,
Line 54, after the second "device", delete ",", and insert -- ; --.

Column 18,
Line 18, after "establishing", delete "signaling".

Signed and Sealed this

Twenty-sixth Day of July, 2005

JON W. DUDAS
*Director of the United States Patent and Trademark Office*